Oct. 22, 1974 J. ROBINSON 3,843,437
WELDING OF DESIGNS ON SYNTHETIC PLASTIC MATERIAL
Filed Dec. 6, 1972 2 Sheets-Sheet 1

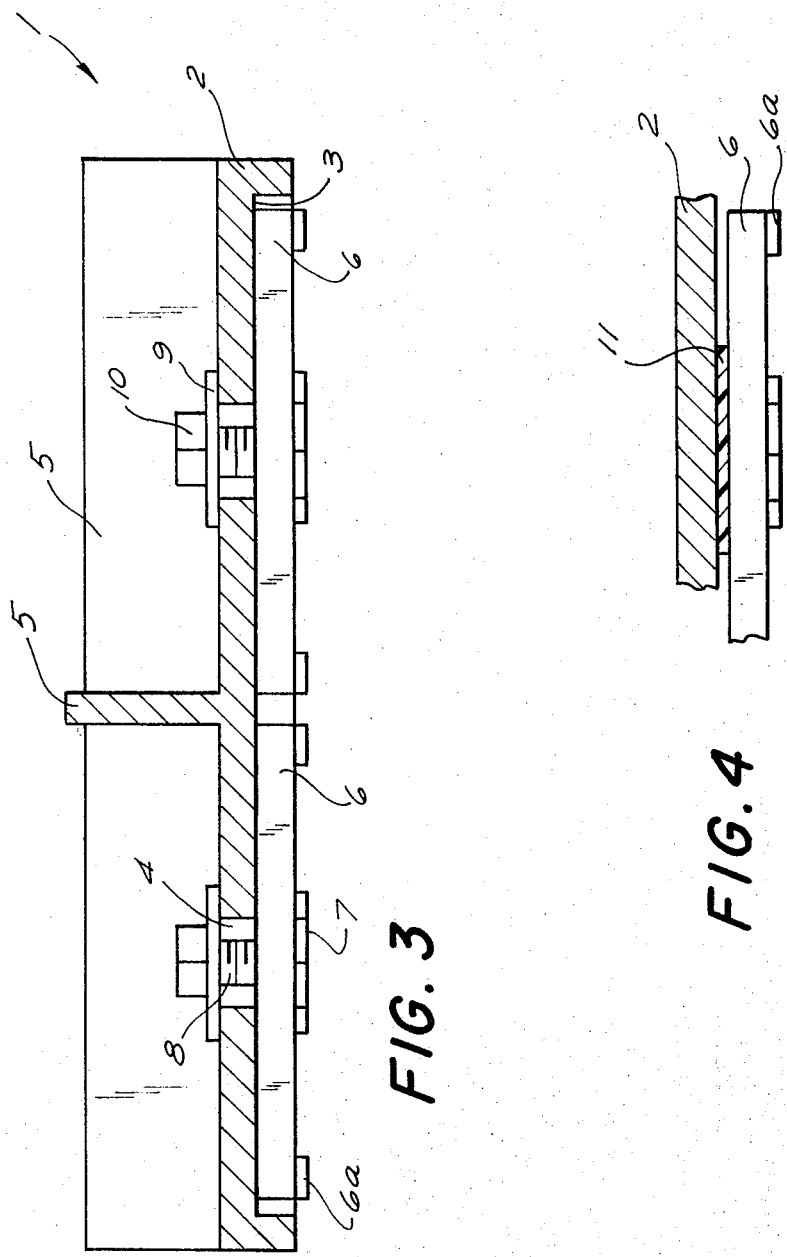

United States Patent Office 3,843,437
Patented Oct. 22, 1974

3,843,437
WELDING OF DESIGNS ON SYNTHETIC
PLASTIC MATERIAL
Jerrold Robinson, Scarsdale, N.Y., assignor to The
Dimension Weld International Corporation
Filed Dec. 6, 1972, Ser. No. 312,517
Int. Cl. B31f 7/00
U.S. Cl. 156—219          6 Claims

ABSTRACT OF THE DISCLOSURE

A method and a composite die are disclosed for providing heat-welded designs on synthetic plastic material having the same designs in printed form. A carrier member carries individual die members each having a design and connecting means connects the die members to the carrier members so that they can be shifted relative to the same in order to provide an adjustment for dimensional changes in the printed design on the synthetic plastic material.

BACKGROUND OF THE INVENTION

The present invention relates generally to the welding of designs on synthetic plastic material and more particularly to an improved method and an improved composite die for carrying out such welding.

It is well known in the art of plastics processing that great difficulties exist when it is attempted to provide registry between a design printed on synthetic plastic sheet material and similar design provided on a die which is to heat-weld the design into the sheet material in registry with the design printed thereon. Basically, the problem is that synthetic plastic sheet materials, in particular polyvinylchloride but also others, are subject to dimensional distortions that may occur for a number of reasons. If a design is printed on such sheet material and such distortion occurs, then of course it is very difficult to provide registry between the thus distorted design and a similar design provided on a die which is to be placed in registry with it prior to heat-welding engagement with the synthetic plastic material, because the design of the die evidently does not share this distortion.

The distortion of the synthetic plastic material may be the result of one or more factors. One of these is mechanical shrinkage, due to handling of the as yet unprinted synthetic plastic sheeting, such as handling, rolling, unrolling, lifting and the like. This will cause the material to temporarily stretch or change shape, especially under elevated temperature conditions such as occur in the summer. This mechanical distortion will for instance cause the sheet material to stretch in one direction. If in this condition the printed design is applied to it, and the sheet material tends to subsequently return to its shape as it usually does, the printed design will evidently become distorted.

Another problem resides in chemical shrinkage, caused by contact of the printing inks and their solvents with the plastic sheet material. This may cause shrinking, puckering, stretching or the like, and will evidently result in distortion of the printed design; superimposed on this distortion may be mechanical distortion as described above.

Another problem is residual shrinkage which appears to be inherent in certain types of synthetic plastic sheet material, particularly polyvinylchloride. It is well known that after its manufacture, polyvinylchloride has a tendency to shrink and/or distort as it ages, this being a continuous process with the passage of time. Evidently, this will continue after a printed design has been applied and will cause the distortion of the printed design.

For these reasons, and possibly others which are not yet well understood, the already printed design image on the synthetic plastic material usually changes shape, that is it undergoes dimensional distortion. This puts it out of register with the die intended to heat weld it and causes innumerable problems when it is attempted to place the die in registry with the printed design prior to the heat welding operation due from the final product. As the size of the printed area increases, the problem also increases because, although the percentage of shrinkage may remain the same, the actual measurement of shrinkage increases with the size of the design. Thus, to take just one example, a 5% shrinkage on a one-inch design is equal to 5/100 of one inch whereas the same 5% shrinkage on a ten-inch design is equal to one-half inch.

The problem is aggravated when it is intended to weld multiple design images of the same or similar designs, or an assortment of such designs with a single die all at one time. The printed area on the plastic sheeting then would contain multiple design image of the same, similar or assorted designs, and of course the die which is to heat-weld them is configurated accordingly. The ultimate aim is to have, after the welding, separate pieces of plastic each of which having the aforementioned design components, that is a printed design, the lines of which are heat welded.

SUMMARY OF THE INVENTION

It is, accordingly, a general object of the present invention to overcome the aforementioned drawbacks of the prior art.

More particularly it is an object of the present invention to provide an improved composite die which avoids the aforementioned difficulties, and a novel method of heat welding pre-printed synthetic plastic material, which method also avoids the disadvantages of the prior art.

In keeping with these objects, and others which will become apparent hereafter, one feature of the invention resides in a composite die, particularly for providing heat-welded designs on synthetic plastic material provided with the same designs in printed form. Briefly stated, the composite die comprises a carrier member having an exposed surface, a plurality of individual die members each having one face in contact with this surface and another face provided with a design, and connecting means connecting each die with the carrier member with freedom of adjustment of the position of the respective die member on the surface. Thus, the position of the respective die member may be varied in dependence upon, and to compensate for, dimensional changes of synthetic plastic material having printed designs with which the designs of the respective die members are intended to register.

According to the prior art the dies were always a fixed unit containing the individual designs, so that they could not be adjusted relative to one another and relative to the printed designs on the sheeting. The present invention avoids this and thus overcomes the problem.

The individual die members may be secured to the carrier member mechanically, by means of an adhesive or for instance by means of a double-faced tape. If the heat welding is carried out by high-frequency welding methods, as is well known in the plastics welding art, then it is necessary that the die members be in electrically conductive contact with the carrier, in which case the connecting means must similarly be electrically conductive.

With the present invention, if distortion occurs in the printed design on the plastic sheet material, it is merely necessary to move one or any necessary number of the die members on the carrier member and to refasten them in the necessary new position, so that each design of a respective die member will now register with the associated printed design on the sheet material. Thereafter, the die is moved into contact with the sheet material to heat-weld the respective designs.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a somewhat diagrammatic vertical section taken through a die according to the present invention; and FIG. 4 is a fragmentary vertical section through another embodiment of the invention.

DESCRIPTION OF THE PREFERRED EMBODIMENTS

Figure 1:
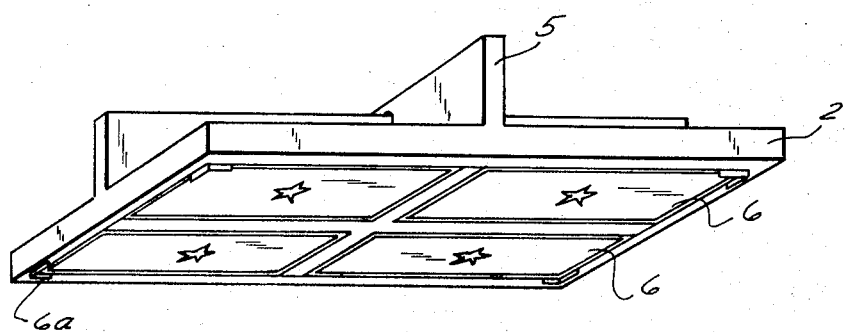
FIG. 1 is a bottom perspective of a die according to the present invention.
Figure 2:
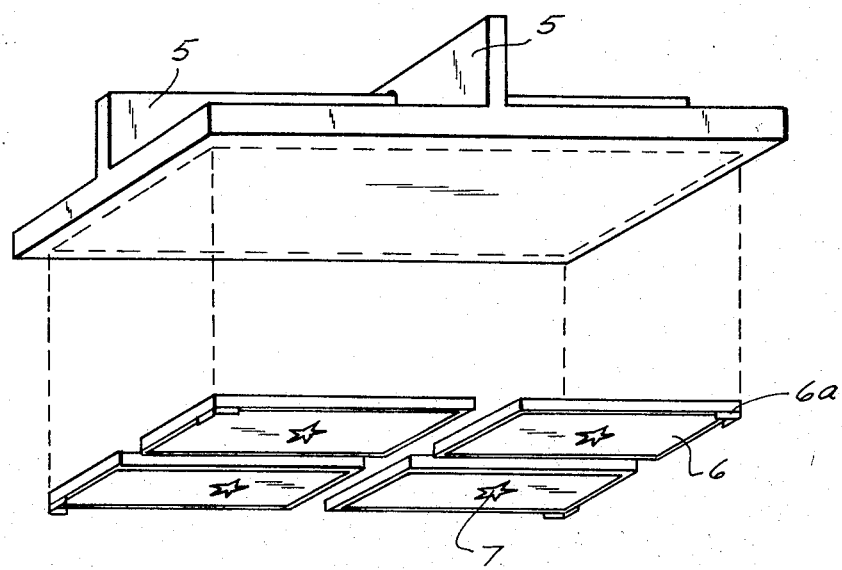
FIG. 2 shows the die members separated from the carrier member for purposes of illustration.

Discussing firstly the embodiment in FIGS. 1–3 it will be seen that the novel die is generally designated with reference numeral 1. It utilizes a carrier member 2 which may be plate-shaped and may be provided with an outer peripheral depending edge portion, or may have a downwardly directed surface which is perfectly planar. This surface is identified with reference numeral 3 and, in the particular illustrated embodiment, it has a plurality of slots 4 (see FIG. 3, but not shown in FIG. 2). Cross bar mounting portions 5 are provided for engaging the carrier member 2 in a manner well-known in the art.

Arranged on the surface 3 is a plurality of die members 6 having at their respective corner register marks 6a. Each die member 6 has a die pattern or design 7, which may be of any desired configuration. This pattern 7 will be largely similar to or identical with printed designs which are provided on synthetic plastic sheet material that is to be welded. This sheet material has not been shown because it is not necessary for an understanding of the invention. At their side facing the surface 3 the die members 6 are provided with respective screws 8 which extend through the slots 4, and at the upper side of the carrier member 2 the screws 8 are surrounded by washers 9 or similar elements and engaged by nuts 10. When these nuts are tightened the die members 6 are retained in their respective positions in contact with the surface 3. If an adjustment is necessary the nuts 10 can be loosened and the die members 6 can then be shifted on the surface 3 in whatever direction is permitted by the configuration of the slots 4. The dimension of the slots 4, which can be replaced with otherwise configurated openings, can be so accommodated to the dimension of the screws 8 that movements in different directions or in only one direction is possible.

High frequency heating means for effecting the welding of the synthetic plastic material once the die has been moved into contact with it, has not been illustrated because this has also known from the art and does not form an inventive concept although it should be understood that it is necessary to provide such means in order to be able to carry out the heat welding of the synthetic plastic.

The embodiment in FIG. 4 is the same as in FIGS. 1–3 except that the slots 4 have been omitted, and that the die members 6 are connected with the carrier member 2 by the illustrated means 11 which may be double-faced tape (that is tape which is adhesive on both sides) or which may be an adhesive. Such tapes and adhesives are well-known in the art and are commercially available so that they need not be further described. The requirement made of them is that they may be such as to hold the die members 6 in place in their desired position, but that they make it possible to release the die members when they have to be moved to compensate for dimensional changes which may have occurred in the printed designs on the synthetic plastic sheet material.

Naturally, other welding means besides dielectric (high-frequency) could be used, for instance ultrasonic or other means. Also, the configurations of the die members and carrier member may be different from what has been illustrated, and although brass is a preferred material for the various members, other metallic materials could also be utilized.

It is hardly necessary to point out that when designs are printed on the synthetic plastic sheet material, registration marks may also be printed on the same, and that during the welding operation these registration marks are to be placed into registration with the register marks 6a of the die members. If the die members 6 were of one piece with the carrier member 2 or were not movable relative to the same, then shrinkage or expansion or otherwise dimensional change in the printed designs on the sheet material would cause the register marks 6a to move out of registration with the registration marks on the sheet. When this occurs the difficulties outlined above will result. If for instance the registration target is aimed at the lower left-hand corner of a design printed on the sheet material, the upper right-hand corner of the same design will then be out of registration and the pieces formed in the lower left-hand corner (the designs welded over the printed designs, would be acceptable, whereas the others would not be acceptable and would have to be discarded. This is avoided by the present invention which makes it possible to shift the die members 6 until the registration marks of each design printed on the sheet material are in registry with the register marks 6a on the respective die member 6, and vice versa, whereupon welding of the respective printed signs can proceed.

Thus, the present invention significantly reduces the difficulties encountered heretofore, and substantially reduces the losses which have until now been experienced.

It will be understood that each of the elements described above, or two or more together, may also find a useful application in other types of constructions, differing from the types described above.

While the invention has been illustrated and described as embodied in the heat-welding of synthetic plastic materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A composite die for providing designs on synthetic plastic material provided with a plurality of similar designs in printed form which are located adjacent one another, comprising a carrier member having an exposed surface; a plurality of individual die members each having one face in contact with said surface, and another face provided with a design which corresponds to one of the printed designs; and connecting means connecting each die member with said carrier member with freedom of adjustment of the position of the respective die member on said surface, so that the position of the design on the respective die member may be varied in dependence upon, and to compensate for, dimensional changes of the synthetic plastic material resulting in out-of-registry movement of respective ones of the printed designs with which the designs of the respective die members are intended to register.

2. A composite die as defined in claim 1, wherein all of said die members are of identical thickness.

3. A composite die as defined in claim 1, wherein said connecting means comprises double-faced adhesive tape.

4. A composite die as defined in claim 1, wherein said connecting means comprises slot and screw means provided in said carrier and die members.

5. A composite die as defined in claim 1, wherein said connecting means comprises adhesive means.

6. A method of heat-welding designs in registry with printed designs on a synthetic plastic material which is subject to dimensional distortion, comprising the steps of providing a synthetic plastic material having a plurality of adjacent designs printed thereon; providing a heat-welding die including a carrier member and a plurality of die members having at least substantial duplicates of said printed designs and being adjustably mounted on said carrier member; effecting juxtaposition and relative movement of said synthetic plastic material and heat-welding die until substantial registry of their designs is reached; and adjusting the positions of said die members on said carrier member until the design of each die member is in registry with a printed design on said synthetic plastic material.

References Cited

UNITED STATES PATENTS

| | | | |
|---|---|---|---|
| 2,024,916 | 12/1935 | Edwards | 101—373 |
| 3,596,035 | 7/1971 | Meenen | 156—274 X |
| 3,100,439 | 8/1963 | Leach | 101—32 |
| 2,246,795 | 6/1941 | Daniels | 101—383 X |
| 2,229,133 | 1/1941 | Sands | 101—383 |

DOUGLAS J. DRUMMOND, Primary Examiner

D. A. SIMMONS, Assistant Examiner

U.S. Cl. X.R.

101—27, 32; 156—277, 384, 581